Figure 1:
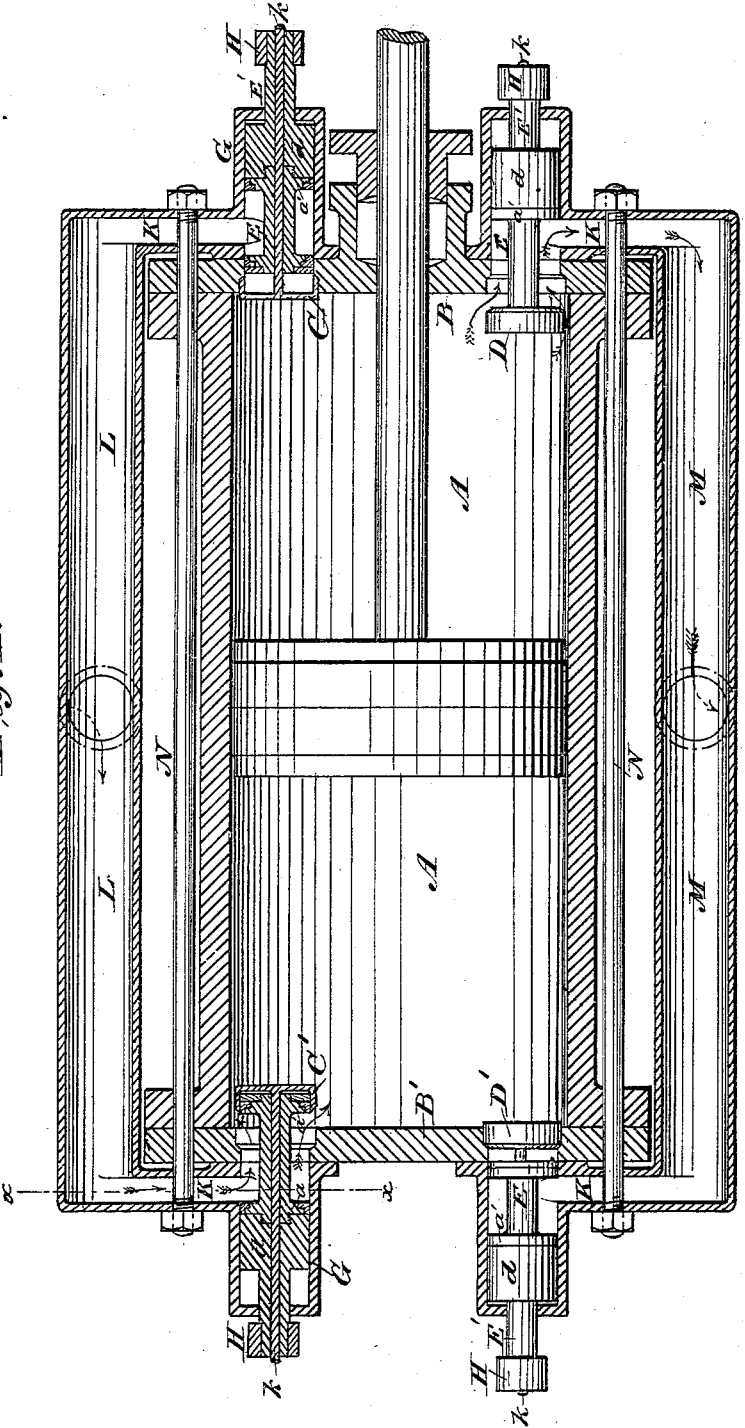

(No Model.)  3 Sheets—Sheet 1.

W. W. ST. JOHN.
VALVE AND VALVE GEAR.

No. 259,432.  Patented June 13, 1882.

WITNESSES  
A. H. Betz.  
A. T. Dangeton

INVENTOR  
William W. St. John,  
by T. C. Brecht  
Attorney

N. PETERS, Photo-Lithographer, Washington, D. C.

(No Model.) 3 Sheets—Sheet 2.
W. W. ST. JOHN.
VALVE AND VALVE GEAR.
No. 259,432. Patented June 13, 1882.
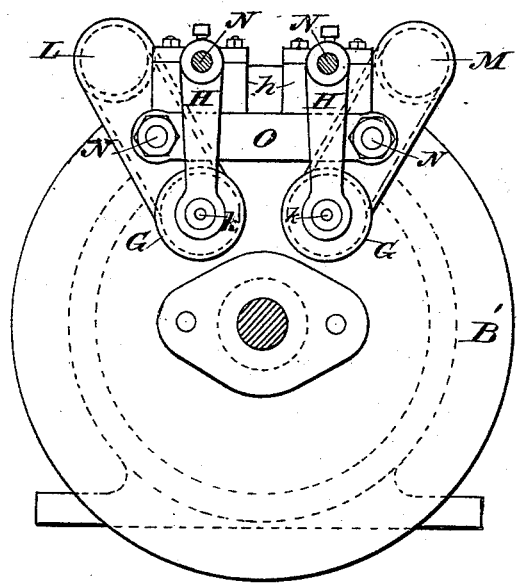
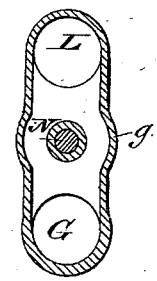
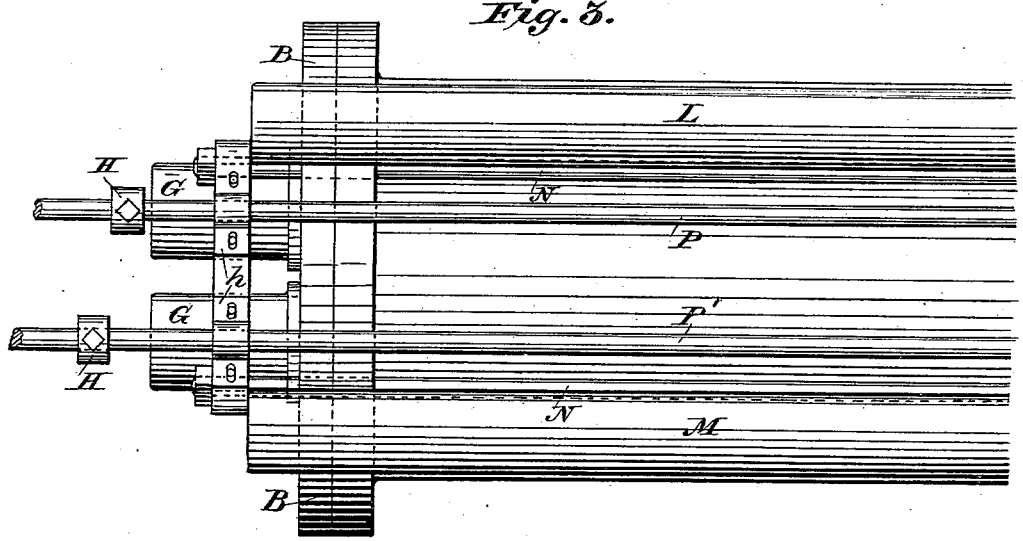
WITNESSES
INVENTOR
William W. St. John,
by T. C. Precht,
Attorney (No Model.)  3 Sheets—Sheet 3.
W. W. ST. JOHN.
VALVE AND VALVE GEAR.
No. 259,432.  Patented June 13, 1882.
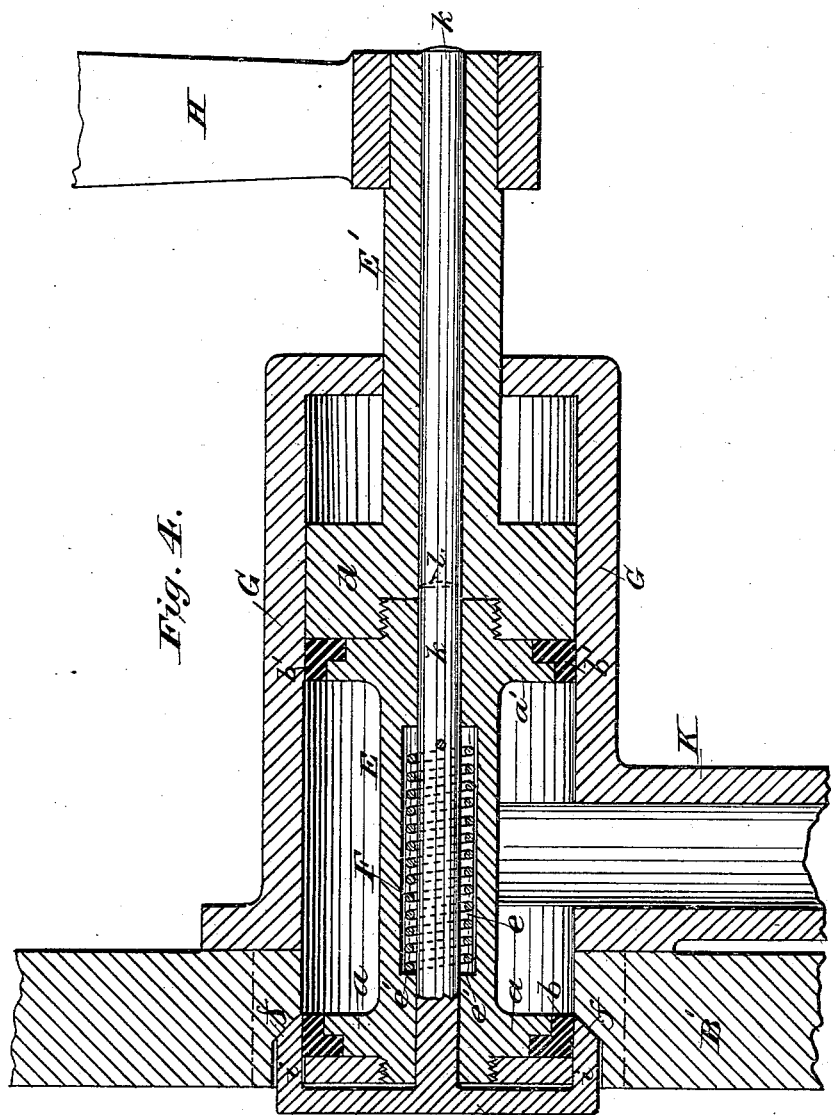
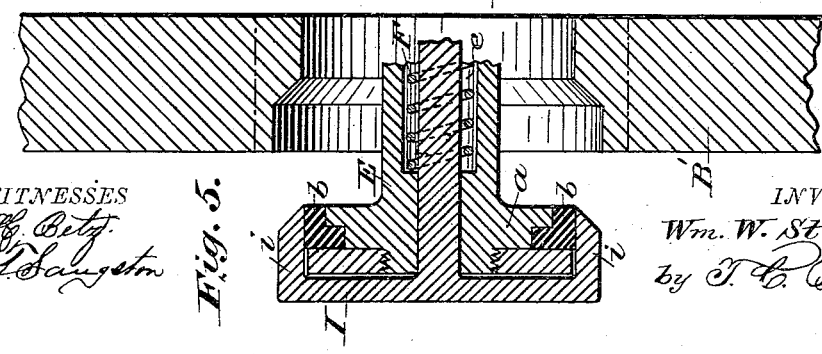
WITNESSES  INVENTOR
Wm. W. St. John,
by T. C. Brecht
Attorney

UNITED STATES PATENT OFFICE.

WILLIAM W. ST. JOHN, OF ST. LOUIS, MISSOURI.

VALVE AND VALVE-GEAR.

SPECIFICATION forming part of Letters Patent No. 259,432, dated June 13, 1882.

Application filed November 19, 1881. (No model.)

*To all whom it may concern:*

Be it known that I, WILLIAM W. ST. JOHN, a citizen of the United States, residing at St. Louis, in the county of St. Louis and State of Missouri, have invented certain new and useful Improvements in Valves and Valve-Gear for Steam-Engines; and I do hereby declare the following to be a full, clear, and exact description of the invention, such as will enable others skilled in the art to which it appertains to make and use the same.

My invention relates to improvements in valves and valve-gear or cut-offs for steam-engines, and the object is to simplify the construction of such valves and valve-gear, render the action of the valves more effective, to utilize the steam in a more direct manner against the piston, to do away with the long steam-ports and cumbersome valves now generally employed, and therefore to make a more economical and powerful engine in proportion to the quantity of steam used and obtain a better result in saving of fuel.

To these ends the invention consists primarily in a new form of piston-valves arranged in the cylinder-heads, and provided with a movable cap, by which the packing of the valve is held in place when it enters the cylinder for the passage of the steam or exhaust; and it also consists in certain details of construction of the valve-gear, as will be more fully described hereinafter, reference being had to the accompanying drawings and the letters of reference marked thereon.

In the drawings, Figure 1 represents a longitudinal section of an engine-cylinder with my improved valves in position. Fig. 2 is an end elevation of the same and the valve-gear. Fig. 3 is a top or plan view of one end of the cylinder with my improved valve-gear. Fig. 4 is an enlarged vertical section of one of the valves in its closed position in the cylinder-head. Fig. 5 is an enlarged vertical section of the same in its open position for the passage of the steam. Fig. 6 is a cross-section on line $x\,x$ of Fig. 1.

In the drawings, A represents the cylinder of an engine, and B B' are the cylinder-heads, of ordinary construction. In the cylinder-heads are arranged the steam-inlet valves C C' and exhaust-valves D D'. The valves (for convenience I will describe one) consist of two piston-heads, $a\,a'$, having preferably a packing-ring, $b\,b'$, of the construction shown in my Patent No. 245,236, for piston-packing, by which they are kept perfectly steam-tight. These rings are held in position by a suitable follower, $c$, either screwed or bolted to its place on the piston-head, and a follower or solid piston, $d$. The two piston-heads are cast or otherwise secured together by a sleeve or spool, E, which is cored or recessed out, as shown at $e$, for the reception of a spring, F. An extension-piece, E', attached to the solid piston $d$, protrudes through the casing G, and to it the arm H, by which the valve is operated, is connected. The solid head $d$ serves to steady the valve by having a long bearing-surface in the casing, and the head $a'$ is preferably screwed into it, but may be secured to it by means of bolts.

A cap, I, having a flange, $i$, which fits exactly over the piston-head $a$, (when the valve is carried forward into the cylinder to admit or exhaust the steam,) serves to hold the packing-ring $b$ in place. This cap is provided with a stem, $k$, which passes through the entire valve, and has a coiled spring, F, secured to it, which is arranged in the recess $e$, and bears against a shoulder, $e'$, in the valve. This spring serves to hold the cap in its place against the recessed shoulder $f$ in the cylinder-head until the piston-head forces it from its seat into the cylinder. The cap remains in that position until the piston-head $a$ has entered it and moved forward, and both are brought back again by the valve-gear.

Instead of the spring shown, positive motion may be imparted to the valve-cap at the proper intervals by a spring arranged on the outside of the arm H, and bearing against the end of the stem; or other suitable mechanism would suggest itself to the skilled mechanic to move the said cap at the proper time, and therefore I do not confine myself to the mechanism herein shown, as regards to moving of the cap.

The casings or steam-chests G are provided with pipes K, extending laterally and connecting with the steam-pipe L and exhaust-pipe M, and they may be cast in one piece or in separate pieces and bolted together. The casings and pipes are held to their position on the cylinder by means of bolts or rods N, which extend from one end to the other, and are preferably passed through the flanges of the cylinder and pipes K. Where they pass through the lateral pipes K the pipes may be provided with enlargements $g$, as shown in the detail view on one sheet, so as to avoid any leakage of steam.

The valve-gear consists of a cross-bar, O, secured by means of the bolts N, and upon said bar are adjustably secured the journal-boxes $h$, through which the rods P P'—one for the steam and the other for the exhaust valves—move. They are operated by a rock-shaft, eccentric, cam, or any suitable mechanism to impart to them a reciprocating movement, and by means of the arms H motion is imparted to the valves. The arms are secured to the rods P P' in any of the well-known manners—such as set-screws, keys, nuts, &c.

A suitable governor may be arranged on the steam-pipe L to regulate the amount of steam required; or the valves may be connected to an eccentric or cam and set to cut off the steam as required. The exhaust passes out through the exhaust-pipe M to the condenser or atmosphere, as described.

The ends of the caps may be left open, if desired, and a movable cap be made to pass over the ends of the casings and secured to the arm H, with which it would slide backward and forward and prevent dust, &c., from coming in contact with the valves.

The advantages of my improved valves and valve-gear will be readily appreciated by those skilled in the art; and some of them are that the steam is admitted directly against the piston without passing through long and circuitous passages. By the use of the cap a very narrow packing-ring and piston-head can be used, and thereby a very short travel of the valve is required. The power or impact of the steam can be better utilized and exerted against the piston and the exhaust-steam is allowed to escape than with the ordinary piston, slide, or other valves. The valves can be kept tighter, and thereby leakage of steam is prevented, by which, of course, a great saving of steam, and therefore economy of fuel, can be obtained. The wear and tear of the valves is a great deal less than in ordinary cases. It makes a very simple and compact arrangement, not easily got out of order, and can be very readily applied to engines now in use as well as to new ones.

The stems may be shortened, as shown by the dotted lines, and the projection be then reduced in diameter, if desired.

Having thus described my invention, what I claim, and desire to secure by Letters Patent, is—

1. A valve-cap adapted to pass over the piston-head of a valve at intervals, as and for the purpose set forth.

2. A piston-valve having a cap provided with a stem projecting through the valve and adapted to pass over the piston-head at certain intervals, as described, and for the purpose specified.

3. A valve-cap having a stem projecting through the body of a piston-valve and arranged to receive the inner head of the valve when it is moved forward into the cylinder, substantially as and for the purpose described.

4. A valve-cap having an annular flange to embrace a piston-head with packing as said head moves into the cylinder at certain intervals, as and for the purpose set forth.

5. A valve-cap having an annular flange, which embraces a piston-head provided with packing as said head is moved into the cylinder, and returns with it until released by striking against a shoulder in the cylinder-head, substantially as and for the purpose described.

6. A valve consisting of a piston-head, $a$, embraced at proper intervals by a flanged cap, having a stem extending through the body of the valve, and a piston-head, $a'$, secured to the head $a$ by a sleeve, E, substantially as specified.

7. The valve herein described, consisting of the piston-heads $a$ $a'$, connected by a sleeve, E, containing a spring, F, the cap I, having stem $k$, and the extension E', for attachment to an operating-arm, all substantially as shown and specified.

8. In valve-gear, the combination of the piston-valves C C' D D', provided with caps I, the casings G, and pipes K L M, with operating valve-gear, substantially as specified, and for the purpose set forth.

9. In valve-gear, the steam-valves C C' and exhaust-valves D D', the caps I, and the casings G, in combination with the rods P P', arms H, cross-bar O, journal-boxes $h$, and suitable rock-shaft, or equivalent means, substantially as and for the purpose set forth.

In testimony whereof I hereby affix my signature in presence of two witnesses.

WILLIAM W. ST. JOHN.

Witnesses:
A. T. SANGSTON,
A. H. BETZ.